United States Patent
Wright et al.

(10) Patent No.: US 11,307,835 B2
(45) Date of Patent: Apr. 19, 2022

(54) METHOD FOR CONTROLLING THE FLOW EXECUTION OF A GENERATED SCRIPT OF A BLOCKCHAIN TRANSACTION

(71) Applicant: nChain Holdings Limited, St. John's (AG)

(72) Inventors: Craig Steven Wright, London (GB); Stephane Savanah, London (GB)

(73) Assignee: nChain Holdings Limited, St. John's (AG)

( * ) Notice: Subject to any disclaimer, the term of this patent is extended or adjusted under 35 U.S.C. 154(b) by 0 days.

(21) Appl. No.: 16/629,291

(22) PCT Filed: Jul. 5, 2018

(86) PCT No.: PCT/IB2018/054969
§ 371 (c)(1),
(2) Date: Jan. 7, 2020

(87) PCT Pub. No.: WO2019/008531
PCT Pub. Date: Jan. 10, 2019

(65) Prior Publication Data
US 2020/0174762 A1    Jun. 4, 2020

(30) Foreign Application Priority Data

Jul. 7, 2017 (GB) .................................... 1710967
Jul. 7, 2017 (GB) .................................... 1710971
(Continued)

(51) Int. Cl.
G06F 8/41      (2018.01)
H04L 9/06      (2006.01)
(Continued)

(52) U.S. Cl.
CPC ................ *G06F 8/433* (2013.01); *G06F 8/31* (2013.01); *G06F 8/41* (2013.01); *G06F 8/443* (2013.01);
(Continued)

(58) Field of Classification Search
None
See application file for complete search history.

(56) References Cited

U.S. PATENT DOCUMENTS 5,761,652 A  *  6/1998  Wu ..................... G06F 16/2264
6,760,905 B1     7/2004  Hostetter et al.
(Continued)

FOREIGN PATENT DOCUMENTS

CN     106598549 A     4/2017
CN     106598579 A     4/2017
(Continued)

OTHER PUBLICATIONS

Costill, Albert, "Bitcoin Scripting and How It Can Be Improved," <https://due.com/blog/bitcoin-scripting-and-how-it-can-be-improved/>, Mar. 25, 2016, p. 1-7. (Year: 2016).*
(Continued)

*Primary Examiner* — Qing Chen
(74) *Attorney, Agent, or Firm* — Davis Wright Tremaine LLP (57) ABSTRACT

The invention provides a computer-implemented method (and corresponding system) for generating a blockchain transaction (Tx). This may be a transaction for the Bitcoin blockchain or another blockchain protocol. The method comprises the step of using a software resource to receive, generate or otherwise derive at least one data item; and then insert, at least once, at least one portion of code into a script associated the transaction. Upon execution of the script, the portion of code provides the functionality of a control flow
(Continued)

mechanism, the behaviour of the control flow mechanism being controlled or influenced by the at least one data item. In one embodiment, the code is copied/inserted into the script more than once. The control flow mechanism can be a loop, such as a while or for loop, or a selection control mechanism such as a switch statement. Thus, the invention allows the generation of a more complex blockchain script and controls how the script will execute when implemented on the blockchain. This, in turns provides control over how or when the output of the blockchain transaction is unlocked.

12 Claims, 3 Drawing Sheets

(30) Foreign Application Priority Data

| Jul. 7, 2017 | (GB) | ................................ 1710974 |
|---|---|---|
| Jul. 7, 2017 | (WO) | ............... PCT/IB2017/054110 |
| Jul. 7, 2017 | (WO) | ............... PCT/IB2017/054113 |
| Jul. 7, 2017 | (WO) | ............... PCT/IB2017/054114 |

(51) Int. Cl.
  *G06F 8/30* (2018.01)
  *H04L 9/32* (2006.01)
  *G06F 8/51* (2018.01)

(52) U.S. Cl.
  CPC ............ *G06F 8/452* (2013.01); *G06F 8/51* (2013.01); *H04L 9/0618* (2013.01); *H04L 9/0637* (2013.01); *H04L 9/0643* (2013.01); *H04L 9/3247* (2013.01); *H04L 9/3297* (2013.01); *H04L 2209/38* (2013.01); *H04L 2209/56* (2013.01)

(56) References Cited

U.S. PATENT DOCUMENTS

| 9,569,206 | B1 | 2/2017 | Dawson et al. | |
|---|---|---|---|---|
| 10,050,779 | B2 | 8/2018 | Alness et al. | |
| 10,871,948 | B1 | 12/2020 | Dowling | |
| 2003/0005404 | A1 | 1/2003 | Bowyer et al. | |
| 2004/0015916 | A1 | 1/2004 | Click et al. | |
| 2014/0068576 | A1 | 3/2014 | Pendap et al. | |
| 2015/0074655 | A1* | 3/2015 | de Lima Ottoni | G06F 8/52 717/154 |
| 2015/0149978 | A1 | 5/2015 | Kim | |
| 2016/0274998 | A1* | 9/2016 | Coyle | G06F 11/362 |
| 2016/0330034 | A1* | 11/2016 | Back | H04L 9/3255 |
| 2017/0287090 | A1 | 10/2017 | Hunn et al. | |
| 2017/0300403 | A1* | 10/2017 | Ramraz | G06F 11/34 |
| 2017/0300627 | A1 | 10/2017 | Giordano et al. | |
| 2018/0293157 | A1* | 10/2018 | Dougherty | G06F 11/3688 |
| 2018/0314938 | A1 | 11/2018 | Andoni et al. | |
| 2019/0116024 | A1 | 4/2019 | Wright et al. | |

FOREIGN PATENT DOCUMENTS

| WO | 2017145006 A1 | 8/2017 |
|---|---|---|
| WO | 2017187398 A1 | 11/2017 |

OTHER PUBLICATIONS

Robinson, "Ivy: A Declarative Predicate Language for Smart Contracts," Slides, Jan. 26, 2017, 8 pages. (Year: 2017).*
Allison, "Jeff Garzik's Bloq runs smart contracts like an 'Ethereum plug-in for Bitcoin,'" International Business Times, May 25, 2016, https://www.ibtimes.co.uk/jeff-garziks-bloq-runs-smart-contracts-like-ethereum-plug-bitcoin-1561976, 5 pages.
Bedford, "How to code with Google Blockly," Tech Advisor, Jun. 12, 2014, https://web.archive.org/web/20170626164055/https://www.techadvisor.co.uk/how-to/software/how-code-with-google-blockly-3524675, 6 pages.
Bhargavan et al., "Formal Verification of Smart Contracts," Proceedings of the 2016 ACM Workshop on Programming Languages and Analysis for Security, Oct. 24, 2016, https://antoine.delignat-lavaud.fr/doc/plas16.pdf, 6 pages.
bitcoininvestor.com, "All-Star Panel: Ed Moy, Joseph VaughnPerling, Trace Mayer, Nick Szabo, Dr. Craig Wright," YouTube, https://youtu.be/LdvQTwjVmrE, Bitcoin Investor Conference, Oct. 29, 2015 [retrieved Dec. 12, 2018], 1 page.
Ceejep et al., "Rfp-8: Higher Level Language Compiling to Transaction Script," Dec. 14, 2015, https://forum.decred.org/threads/rfp-8-higher-level-language-compiling-totransaction-script.3665/, 7 pages.
Chain, "Announcing Ivy Playground," Medium, May 17, 2017, https://web.archive.org/web/20170518000630/https://blog.chain.com/announcing-ivy-playground-395364675d0a, 12 pages.
Chen et al., "Under-Optimized Smart Contracts Devour Your Money," IEEE 24th International Conference on Software Analysis, Evolution and Reengineering (SANER), Feb. 20, 2017, https://arxiv.org/pdf/1703.03994.pdf, 5 pages.
Curiosity Driven, "Bitcoin contracts compiler," Sep. 6, 2014, https://github.com/curiosity-driven/bitcoin-contracts-compiler, 2 pages.
Curiosity Driven, "Bitcoin contracts," Apr. 8, 2016, https://curiosity-driven.org/bitcoin-contracts, 10 pages.
Curiosity Driven, "Superscript compiler," Sep. 6, 2014, https://github.com/curiosity-driven/bitcoin-contracts-compiler/commits/master, 1 page.
De Rosa, "A developer-oriented series about Bitcoin—Section 10: The Bitcoin Script language (pt. 1) and Section 11: The Bitcoin Script language (pt. 2)," May 25, 2015, https://davidederosa.com/basic-blockchain-programming/, 17 pages.
Etherscan, "ByteCode to Opcode Disassembler," Etherscan, the Ethereum Block Explorer, Aug. 2015, https://etherscan.io/address/0xafdacfee6395bc1e480a900943f1803f854bc20e, 3 pages.
Etherscan, "Contract Address—Transaction Example," Etherscan, the Etheruem Block Explorer, Oct. 20, 2016, 3 pages.
Etherscan, "Contract Address," Etherscan, the Etheruem Block Explorer, copyright 2017, https://etherscan.io/address/0x5a4964bb5fdd3ce646bb6aa02070417d4db79302, 4 pages.
Exab et al., "Understanding the risk of BU (bitcoin unlimited)," Reddit, Feb. 22, 20217, https://www.reddit.com/r/Bitcoin/comments/5vo5wi/understanding_the_risk_of_bu_bitcoin_unlimited/, 27 pages.
FMLFPL111 et al., "It's there a solution to the scaling problem?," Reddit, Jan. 25, 2017, https://www.reddit.com/r/Monero/comments/5q3fcf/its_there_a_solution_to_the_scaling_problem/, 14 pages.
Frontier, "State Machine," Gitbooks, Mar. 15, 2017, https://ethereum.gitbooks.io/frontierguide/content/opcodes,_costs,_and_gas.html, 1 page.
Gitbook, "Ethereum Frontier Guide," Gitbook (Legacy), Feb. 4, 2016, 293 pages.
International Search Report and Written Opinion dated Aug. 30, 2018, Patent Application No. PCT/IB2018/054970, 13 pages.
International Search Report and Written Opinion dated Aug. 30, 2018, Patent Application No. PCT/IB2018/054971, 12 pages.
International Search Report and Written Opinion dated Mar. 23, 2018, Patent Application No. PCT/IB2017/054110, 13 pages.
International Search Report and Written Opinion dated Mar. 23, 2018, Patent Application No. PCT/IB2017/054113, 13 pages.
International Search Report and Written Opinion dated Sep. 3, 2018, Patent Application No. PCT/IB2018/054969, 13 pages.
Klmoney, "Part 1: Transaction Basics," Jun. 6, 2017, Wordpress, https://web.archive.org/web/20170606202729/https://klmoney.wordpress.com/bitcoin-dissecting-transactions-part-1/, 9 pages.
Klmoney, "Part 2: Building a Transaction By Hand," Wordpress, Jun. 7, 2017, https://web.archive.org/web/20170607015517/https://klmoney.wordpress.com/bitcoin-dissecting-transactions-part-2-building-a-transaction-by-hand/, 21 pages.
Kosba et al., "Hawk: The Blockchain Model of Cryptography and Privacy-Preserving Smart Contracts," IEEE Symposium on Security and Privacy, May 22, 2016, 31 pages.

(56) References Cited

OTHER PUBLICATIONS

Le Calvez, "A look at Bitcoin non-standard outputs," Medium, Nov. 8, 2015 [retrieved Feb. 28, 2017], https://medium.com/@alcio/a-look-at-bitcoin-non-standard-outputs-c97f65cccbb6#.3fw5ur52k, 6 pages.

Lerner, "RSK Rootstock Platform Bitcoin powered Smart Contracts White Paper version 9," Nov. 19, 2015, https://uploads.strikinglycdn.com/files/90847694-70f0-4668-ba7fdd0c6b0b00a1/RootstockWhitePaperv9-Overview.pdf, 24 pages.

Morgenstern, "Forth's Stacks," Forth.org, Nov. 14, 2016, https://web.archive.org/web/20161114030625/http://www.forth.org/svfig/Len/softstak.htm, 3 pages.

Nakamoto, "Bitcoin: A Peer-to-Peer Electronic Cash System," Bitcoin, Oct. 31, 2008, https://bitcoin.org/bitcoin.pdf, 9 pages.

Rensylvain et al., "Any truth to haveing turing complete programming worked into bitcoin via an OP code?," Reddit, Dec. 13, 2015, https://www.reddit.com/r/Bitcoin/comments/3wpkd0/any_truth_to_haveing_turing_complete_programming/, 14 pages.

Rios et al., "Derivative-free optimization: a review of algorithms and comparison of software implementations," Journal of Global Optimization 56(3):1247-93, Jul. 12, 2012.

Robinson, "Ivy: A Declarative Predicate Language for Smart Contracts," Chain, https://cyber.stanford.edu/sites/default/files/danrobinson.pdf, Jan. 2017, 30 pages.

Sarchar et al., "[Announce] Whitepaper for Bitstorage—a peer to peer, cloud storage network," Bitcoin Forum, Nov. 27, 2013, https://bitcointalk.org/index.php?topic=348868.0, 10 pages.

Stevenroose et al., "IRC Chat Log Feb. 9, 2016," Bitcoin Wizards, Feb. 9, 2016, https://irclog.whitequark.org/bitcoin-wizards/2016-02-09, pages.

Tekknolagi et al., "How to implement LOOP in a FORTH-like language interpreter written in C," Stack Overflow, Aug. 4, 2011, https://web.archive.org/web/20150531001644/https://stackoverflow.com/questions/6949434/how-to-implement-loop-in-a-forth-like-language-interpreter-written-in-c, 4 pages.

UK Commercial Search Report dated Nov. 17, 2017, Patent Application No. GB1710974.5, 9 pages.

UK IPO Search Report dated Dec. 21, 2017, Patent Application No. GB1710967.9, 9 pages.

UK IPO Search Report dated Dec. 21, 2017, Patent Application No. GB1710971.1, 9 pages.

UK IPO Search Report dated Dec. 21, 2017, Patent Application No. GB1710974.5, 9 pages.

Wikipedia, "Proof of space," Wikipedia the Free Encyclopedia, Jul. 11, 2017, https://en.wikipedia.org/w/index.php?title=Proof-of-space?oldid=790069182, 5 pages.

Willis et al., "TX Script—Documentation," GitHub, Jun. 27, 2016, https://github.com/Kefkius/txsc/blob/master/doc/txscript.asciidoc, 8 pages.

Willis et al., "TX Script—History," GitHub, Jun. 27, 2016, https://github.com/Kefkius/txsc/commits/master/doc/txscript.asciidoc, 2 pages.

Willis et al., "TX Script," GitHub, Jun. 27, 2016, https://github.com/Kefkius/txsc, 3 pages.

Zyskind, "Efficient secure computation enabled by blockchain technology," Doctoral dissertation, Massachusetts Institute of Technology, Jun. 2016, https://pdfs.semanticscholar.org/5b54/7a7f2e47af79429d9467701538434d8e6bcb.pdf, 128 pages.

\* cited by examiner

METHOD FOR CONTROLLING THE FLOW EXECUTION OF A GENERATED SCRIPT OF A BLOCKCHAIN TRANSACTION

This invention relates generally to blockchain technology, and more particularly to implementing complex functionality via the blockchain. Advantageously, the invention provides a mechanism which enables blockchain transactions to include the functionality that would normally be provided by a control-flow structure. Thus, the invention extends the capabilities and functionality of blockchain scripts, and thus the blockchain protocol itself, without having to modify the underlying, existing protocol. Transactions which are generated in accordance with the invention can be used as control mechanisms for enabling, influencing and directing the activities of a computer-implemented process. The invention is suited for, but not limited to, the implementation and control of automated processes.

In this document we use the term 'blockchain' to include all forms of consensus-based electronic, computer-based distributed ledgers, including, but not limited to blockchain and transaction-chain technologies, permissioned and unpermissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

In accordance with the present invention there is provided a computer-implemented system/method as defined in the appended claims.

The invention may provide a computer-implemented method. It may be described as a method arranged to enable, or suitable for, generating a blockchain transaction (Tx). Additionally or alternatively, it may be described as a method for controlling the execution of a transaction (Tx) script to control or influence whether an output associated with a blockchain transaction can be unlocked (spent). Thus, it is a method which control or influences a cryptographic process. It may also be described as controlling the transfer or exchange of a resource via a blockchain network. The invention may also be described as providing a security technique which allows or enables Turing-complete functionality to be provided within and by blockchain scripts without compromising resilience to exploits. Thus, the invention provides an enhanced blockchain, because it is possible to execute transfers and exchanges across a blockchain network in a more sophisticated and technically superior manner while preserving the security and safeguards against exploits of the protocol.

The method may comprise the step of using a software resource to receive or generate or otherwise derive at least one data item. The data item may also be referred to as a "signal", "value", "parameter" or "input". The data item may be received as a signal. It may be received from an off-chain source. Thus, the data item may be used to determine how many times the code is copied or inserted into the script and may be determined and/or generated outside the script. It may be generated by a computing resource as the result of a computation. It may be generated by the use of a random or pseudo-random number generator.

It may comprise the step of inserting, at least once, at least one portion of code into a script associated with, or for, a blockchain transaction such that, upon execution of the script, it provides the functionality of a control flow mechanism. The portion of code may be pre-designated or pre-written. It may be stored in a computer-based resource and may be retrieved from storage prior to insertion into the script.

The script may be associated with the transaction in that it forms part of the transaction and/or can be used to lock/unlock a portion of cryptocurrency to be transferred using the transaction.

The method may comprise the step of generating the blockchain transaction. It may comprise the step of submitting the transaction to the blockchain network. It may comprise the step of using the transaction to transfer a resource, or control of a resource, from one node or party to another node or party on the network.

The behaviour/execution of the control flow mechanism may be controlled or influenced by the at least one data item. Preferably, the script may not comprise any Turing complete control structures (e.g. loops, recursive jumps, high level control structures) following insertion of the at least one portion of code. Preferably, following the at least one insertion of the at least one portion of code the script is compatible for execution on a blockchain which uses a functionally restricted (non-Turing complete) language. This may be the Script language used by blockchains which implement the Bitcoin protocol or variant thereof.

The script may be associated with an input or output of the blockchain transaction. The transaction may be generated in accordance with a blockchain protocol. This may be the Bitcoin protocol. The script may be written in the Script programming language, or another stack-based scripting language. The script may be written in a functionally-restricted (which may alternatively be referred to as "non-Turing Complete") language. The language may be functionally restricted in the sense that it does not natively support one or more control flow mechanisms such as loops and/or recursive jumps.

The method may comprise the step of inserting and/or copying the at least one portion of code into the script more than once, and/or at more than one location within the script.

The method may comprise the step of using the at least one data item to determine how many times the at least one portion of code is inserted/copied into the script.

The control flow mechanism may be a loop, such as a for or while loop, or a selection control mechanism such as a switch/Case statement.

The at least one data item may be derived from a compiler which is arranged to translate code from a High Level Language (HLL) into a blockchain transaction script.

The portion of code may include a counter or index which is incremented at least once upon execution of the script, the counter or index being used to control or influence the execution of the script.

The counter or index may be incremented or otherwise manipulated using values stored in and/or retrieved from two stack-based data structures.

The invention may also comprise a computer-implemented system arranged to implement the method of any embodiment described herein. Any aspect or feature described in relation to the method may also apply to the corresponding system. The system may comprise at least one computer-based resource. It may also comprise one or more blockchain nodes.

The invention also provides a system, comprising:
 a processor; and
 memory including executable instructions that, as a result of execution by the processor, causes the system to perform any embodiment of the computer-implemented method described herein.

The invention also provides a non-transitory computer-readable storage medium having stored thereon executable instructions that, as a result of being executed by a processor of a computer system, cause the computer system to at least perform an embodiment of the computer-implemented method described herein.

These and other aspects of the present invention will be apparent from and elucidated with reference to, the embodiment described herein. An embodiment of the present invention will now be described, by way of example only, and with reference to the accompany drawings, in which:

Figure 1:
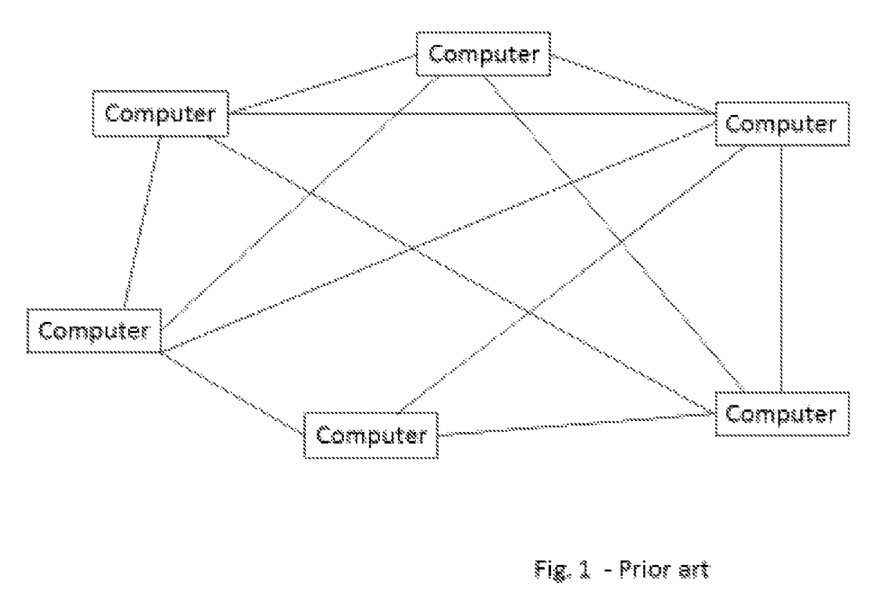
FIG. 1 provides a simple illustration of a decentralised blockchain network, as is known in the prior art.

The Bitcoin network is one example of a blockchain implementation, as shown in FIG. 1. Bitcoin utilises a scripting language, known as Script. Script is a Forth-like language which uses a set of primitive operators or commands, known as op_codes, for the creation of relatively simple programs. Script uses a data structure known as a stack for the temporary storage of data items (variables and constants) during program execution. Items are pushed onto the stack, one on top of the other, and popped off in reverse order. Typically, items pushed onto the stack will be subsequently popped off in order to use them as operands for the next operation. When the Script program ends, the value left on the top of stack is the return value.

As is known in other stack-based languages such as Forth, it is often convenient to have access to a further stack. In Script, this second stack is known as the alt stack, while the first stack is the known as the main stack. The alt stack is typically used for storing temporary data during script execution.

In contrast to Forth, however, Script does not feature a built-in syntax for executing complex control flow statements such as loops. Control flow statements are programming mechanisms which are used to influence and dictate (i.e. control) the way that a program executes. A particular value is used to determine which path the logic takes at run time. These values could be hard-coded into the program or provided at runtime as dynamic input. The value(s) can then be used in a decision making process (e.g. is value a less than or equal to value b? Does string x="Hello World!"?). Examples of control flow statements include while loops, for-loops and switch-case statements.

Script's prohibition of such mechanisms is a deliberate security feature: complex control mechanisms can potentially leave the blockchain network vulnerable to exploits such as Denial-of-Service (DOS or DDOS) attacks. The trade-off is, however, that the programmer is restricted with respect to the way in which Script code can be written. E.g. cannot include loops in the source code. This has led some to describe Script as being non-Turing complete (although others refute this definition). One known Bitcoin alternative, Ethereum, has attempted to overcome this restriction by incorporating a Turing-Complete language into its protocol as a native feature. At the time of writing, however, Ethereum has suffered from at least one serious exploit.

Therefore, there is a need to provide a technical solution which addresses the trade-off between the security provided by a functionally restricted blockchain scripting language, such as Script, and the desire to execute more complex functionality via a blockchain platform. Ideally, this would be achieved in a manner which facilitates the coding process eg by automation via a software resource.

The present invention provides a solution to at least this problem, and enables a mechanism whereby the functionality of complex control flow mechanisms can be achieved or at least emulated using a functionally restricted scripting language on the blockchain. (Due to the debate within the field as to Script's Turing completeness, we may refer herein to such languages as "functionally restricted" rather than "non-Turing complete" although the terms may be used interchangeably). The examples we will use herein, for illustrative purposes only, present solutions that allow for emulation of both for-loops and switch-case control sequences. The skilled person will understand that other types of control flow mechanisms may be provided by the invention.

Figure 2:
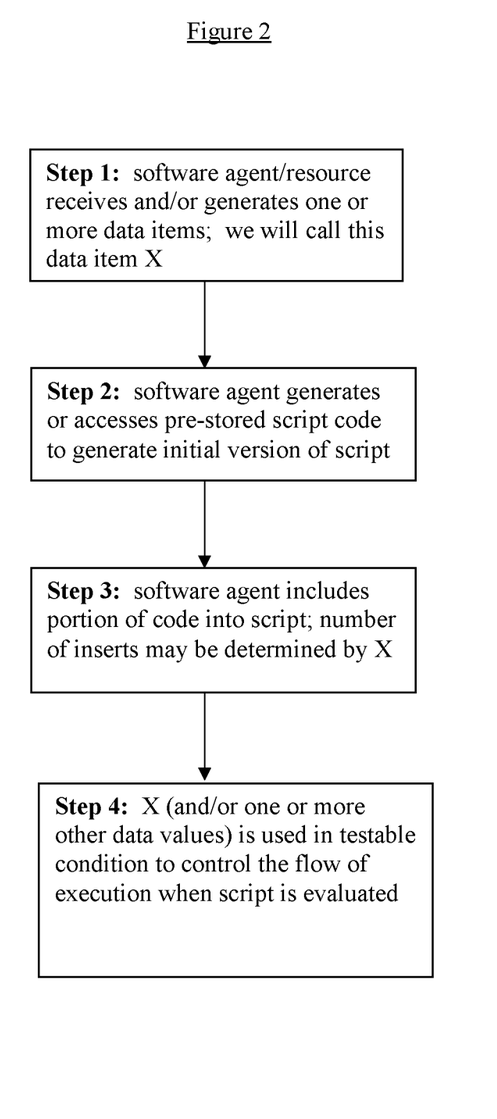
FIG. 2 shows a flowchart illustrating an embodiment in accordance with the invention.

A process which can be used in accordance with the present invention is illustrated in the flow chart of FIG. 2. In accordance with the present invention, a determination is made as to how the logic should be controlled within a transaction (Tx) script. For example, this could be a pre-determination of the statements that should be executed within the body a loop per iteration, or the statements that should be executed for each of the options (cases) in a switch construct. These can be stored as portion(s) of code for subsequent retrieval during the generation of the script/transaction.

Once generated or received, the determination is then used to generate the code for the script of a blockchain transaction. This could be an unlocking script, redeem script or unlocking script. In particular, a portion of code is inserted into the script a desired number of times, at the appropriate location(s) within the script.

The portion of code may be, for example, the code which executes an instance of a loop, or an option in a switch command sequence. The portion of code is repeated within the script as required, such that one or more statements will be potentially executed based up the value of a data item and/or evaluation of a condition. For example, if (i<3) Then <execute body of loop> or if (i==2) Then <execute statement(s) and break out of switch>.

The generation of the script code can be performed manually. However, in a preferred embodiment of the invention the code (and overall transaction) is generated by an automated process i.e. by a suitably arranged software resource or agent executing on a processor.

In such an embodiment, the software agent is arranged to receive or generate a data item. This data item is an input or signal which can be used to determine the number of times the portion of code needs to be provided within the script. The same, or another, data item can be used to control the execution of the script during evaluation, for example by use within a condition that controls a loop, or by use as the value against which a switch case is tested.

In addition, the portion of code can be pre-determined and stored in memory. When the software agent needs to generate the script, the portion of code can be accessed from memory, inserted into the script as many times as required, and adapted accordingly so as to test the relevant control condition using the data item(s) mentioned above.

Thus, once the software agent has received the relevant data item(s), it can use that data item to generate a transaction script which includes code to emulate complex control-flow functionality as required at run-time. This script can be used in the generation of a blockchain transaction which may then be submitted to the network for validation and propagation.

Therefore, the invention can be used to control the way in which a script which is associated with an input/output of a blockchain transaction executes. In effect, this controls whether or not an output associated with a transaction (Tx) can be spent, and in turn whether cryptographic ownership of an asset on the blockchain (e.g. a portion of cryptocurrency, a token etc) can be transferred from one entity to another. In another sense, the invention controls or influences a cryptographic process.

Examples are now provided to analyse and explain the concepts and techniques set out above.

EXAMPLE USE 1

Emulation of For-Loops

In this example, we provide a Script-based sequence of operations which emulates the behaviour of a for-loop, as if the latter were supported natively by the language.

The loop is of the form:

```
for i in [K,N]
    <execute statements> // the "body" of the loop
end
```

Let K and N be the lower and upper bound of the interval I=[K:N], respectively. The sequence of operations takes on the following form:

```
OP_N OP_K OP_2DUP OP_SWAP OP_TOALTSTACK OP_TOALTSTACK
OP_GREATERTHAN
OP_IF
 OP_FROMALTSTACK OP_1ADD OP_TOALTSTACK
 <EXECUTE STATEMENTS>
OP_ENDIF
OP_FROMALTSTACK OP_FROMALTSTACK OP_2DUP OP_TOALTSTACK
OP_TOALTSTACK OP_SWAP
OP_GREATERTHAN
OP_IF
 OP_FROMALTSTACK OP_1ADD OP_TOALTSTACK
 <EXECUTE STATEMENTS>
OP_ENDIF
 OP_FROMALTSTACK OP_FROMALTSTACK OP_2DUP OP_TOALTSTACK
OP_TOALTSTACK OP_SWAP
OP_GREATERTHAN
 OP_IF
OP_FROMALTSTACK OP_1ADD OP_TOALTSTACK
 <EXECUTE STATEMENTS>
OP_ENDIF
 OP_FROMALTSTACK OP_FROMALTSTACK OP_2DUP OP_TOALTSTACK
OP_TOALTSTACK OP_SWAP
...
...
OP_GREATERTHAN
 OP_IF
 OP_FROMALTSTACK OP_1ADD OP_TOALTSTACK
 <EXECUTE STATEMENTS>
OP_ENDIF
 OP_FROMALTSTACK OP_FROMALTSTACK OP_2DUP OP_TOALTSTACK
OP_TOALTSTACK OP_SWAP
OP_DROP OP_DROP
```

It should be noted that the box, which represents an instance of the loop, is provided multiple times, say P times with P>N. Also, the code for the body of the loop <EXECUTE STATEMENTS> should not modify the state of either the main stack or the alt-stack.

LOOP EXAMPLE 1

Loop from 0 to 2

In the example below, we assume that the code in the box is copied three times. In the example, we verify that <EXECUTE STATEMENTS> is executed 2 times.
Considering the following piece of code:
OP_2 OP_0 OP_2DUP OP_SWAP OP_TOALTSTACK OP_TOALTSTACK
the stack should look like this (the left column is the main stack, right column is the alt stack)

```
              0                                  0
              2                                  2
OP_GREATERTHAN
OP_IF
 OP_FROMALTSTACK OP_1ADD OP_TOALTSTACK
   <EXECUTE STATEMENTS>
OP_ENDIF
OP_FROMALTSTACK OP_FROMALSTACK OP_2DUP OP_TOALTSTACK
OP_TOALTSTACK OP_SWAP
              1                                  1
              2                                  2
OP_GREATERTHAN
OP_IF
 OP_FROMALTSTACK OP_1ADD OP_TOALTSTACK
 <EXECUTE STATEMENTS>
OP_ENDIF
OP_OP FROMALTSTACK OP_FORMALSTACK OP_2DUP OP_TOALTSTACK
OP_TOALTSTACK OP_SWAP
              2                                  2
              2                                  2
OP_GREATERTHAN
OP_IF
 OP_FROMALTSTACK OP_1ADD OP_TOALTSTACK
 <EXECUTE STATEMENTS>
 OP_ENDIF
OP_FROMALTSTACK OP_FORMALSTACK OP_2DUP OP_TOALTSTACK
OP_TOALTSTACK OP_SWAP
              2                                  2
              2                                  2
OP_DROP OP_DROP
                                                 2
                                                 2
```

EXAMPLE USE 2

Emulation of Switch-Case Command Sequence

In this example, we describe a Bitcoin Script emulation of a switch command sequence. We wish to emulate a command sequence of the following kind:

```
(switch on)
case i equals value1
    execute statements
    break
case i equals value2
    execute statements
    break
...
...
case i equals valueN
    execute statements
    break
(switch off)
```

Now, let X be the value we wish to check for. Written using the syntax of the Bitcoin Script language, the switch case code becomes:

```
OP_X OP_DUP OP_TOALTSTACK
OP_1 OP_EQUAL
OP_IF
    <EXECUTE STATEMENTS 1>
OP_ENDIF
OP_FROMALTSTACK OP_DUP OP_TOALTSTACK
OP_2 OP_EQUAL
OP_IF
    <EXECUTE STATEMENTS 2>
OP_ENDIF
OP_FROMALTSTACK OP_DUP OP_TOALTSTACK
...
...
```

-continued

```
OP_N OP_EQUAL
OP_IF
    <EXECUTE STATEMENTS N>
OP_ENDIF
OP_FROMALTSTACK OP_DUP OP_TOALTSTACK OP_DROP
```

EXAMPLE 1

The input signal is OP_2. We check the code executes <EXECUTE STATEMENTS 2> only, and we assume that the code contains three statements.

```
OP_2 OP_DUP OP_TOALTSTACK
              2                                  2
OP_1 OP_EQUAL
              0                                  2
```

-continued

```
OP_IF
    <EXECUTE STATEMENTS 1>
OP_ENDIF
OP_FROMALTSTACK OP_DUP OP_TOALTSTACK
        2                                   2
OP_2 OP_EQUAL
        1                                   2
OP_IF
    <EXECUTE STATEMENTS 2>
OP_ENDIF
OP_FROMALTSTACK OP_DUP OP_TOALTSTACK
        2                                   2
OP_3 OP_EQUAL
        0                                   2
OP_IF
    <EXECUTE STATEMENTS 3>
OP_ENDIF
OP_FROMALTSTACK OP_DUP OP_TOALTSTACK
        2                                   2
OP_DROP
                                            2
```

Blockchain Network

Figure 3:
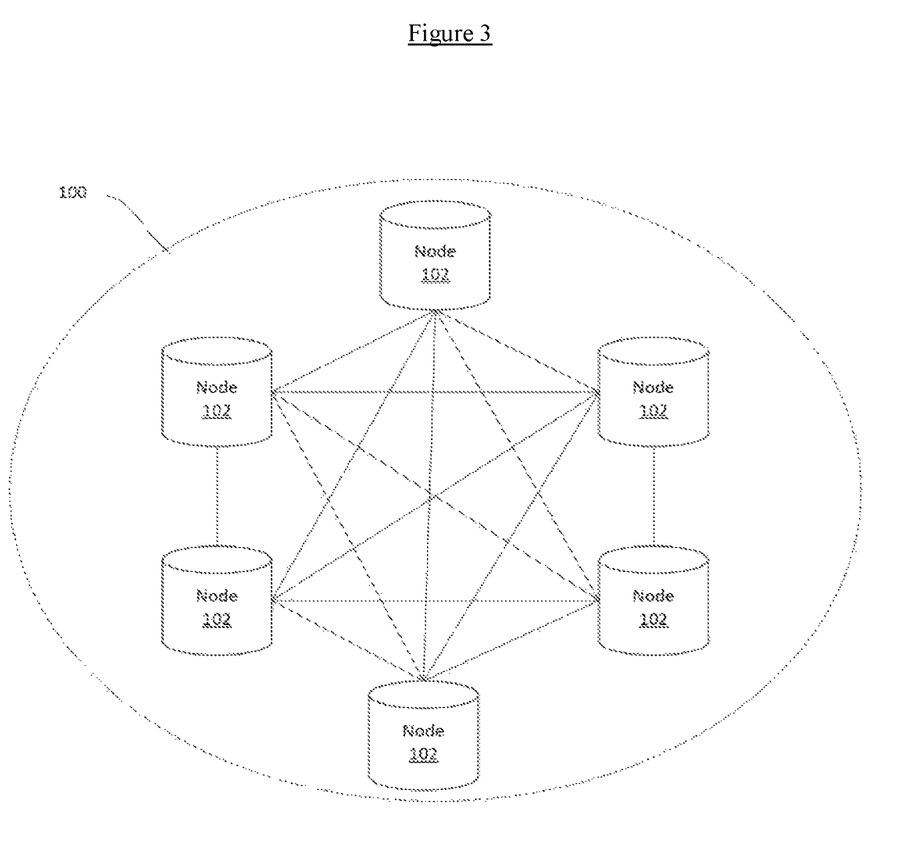
FIG. 3 illustrates an example network associated with a blockchain, which may be used in accordance with the present invention.

Reference is now made to FIG. 3 which illustrates, in block diagram form, an example network associated with a blockchain, which may be referred to herein as a blockchain network 100, and may be utilised for implementation of the present invention. The blockchain network 100 is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the nodes 102 may be located in geographically dispersed locations.

Nodes 102 maintain a global ledger of all transactions on the blockchain, grouped into blocks, each of which contains a hash of the previous block in the chain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which value is transferred as a result of the transaction. That value is then associated with that output address as an unspent transaction output (UTXO). A subsequent transaction may then reference that address as an input in order to spend or disperse that value.

Nodes 102 can fulfil numerous different functions, from network routing to wallet services, to maintain a robust and secure decentralized public ledger. "Full nodes" contain a complete and up-to-date copy of the blockchain, and can therefore verify any transactions (spent or unspent) on the public ledger. "Lightweight nodes" (or SPV) maintain a subset of the blockchain and can verify transactions using a "simplified payment verification" technique. Lightweight nodes only download the headers of blocks, and not the transactions within each block. These nodes therefore rely on peers to verify their transactions. "Mining nodes", which can be full or lightweight nodes, are responsible for validating transactions and creating new blocks on the blockchain. "Wallet nodes", which are typically lightweight nodes, handle wallet services of users. Nodes 102 communicate with each other using a connection-oriented protocol, such as TCP/IP (Transmission Control Protocol).

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method, comprising the steps of:
   receiving, generating, or otherwise deriving at least one data item;
   inserting, at least once, at least one portion of code into a script associated with a blockchain transaction such that, upon execution of the script, the script provides a functionality of a control flow mechanism, wherein a behavior of the control flow mechanism is controlled or influenced by the at least one data item; and
   inserting or copying the at least one portion of code into the script more than once and at more than one location within the script,
   wherein the functionality of the control flow mechanism is enabled or emulated in the script at least by using the at least one data item to determine a number of times to insert or copy the at least one portion of the code into the script, and
   wherein the script is written in a scripting language that is functionally restricted on a blockchain.

2. The computer-implemented method according to claim 1, wherein:
   the script is associated with an input or output of the blockchain transaction.

3. The computer-implemented method according to claim 1, wherein:

the blockchain transaction is generated in accordance with, or for use with, a blockchain protocol.

4. The computer-implemented method according to claim 3, wherein:
the blockchain protocol is a Bitcoin protocol or a variant of the Bitcoin protocol.

5. The computer-implemented method according to claim 1, wherein:
the control flow mechanism is a loop or a selection control mechanism.

6. The computer-implemented method according to claim 1, wherein:
the at least one data item is derived from a compiler which is arranged to translate code from a High Level Language (HLL) into a blockchain transaction script.

7. The computer-implemented method according to claim 1, wherein:
the at least one portion of code includes a counter or index which is incremented at least once upon the execution of the script, the counter or index being used to control or influence the execution of the script.

8. The computer-implemented method according to claim 7, wherein:
the counter or index is incremented or otherwise manipulated using values stored in or retrieved from two stack-based data structures.

9. The computer-implemented method according to claim 1, wherein:
the scripting language is non-Turing complete.

10. A computer-implemented system comprising:
an electronic device;
one or more processors coupled to the electronic device; and
a memory coupled to the one or more processors, the memory having stored thereon computer executable instructions that, when executed, cause the one or more processors to implement the computer-implemented method of claim 1.

11. A non-transitory computer readable storage medium comprising computer-executable instructions that, when executed, cause a processor to perform the computer-implemented method of claim 1.

12. An electronic device comprising:
an interface device;
a processor coupled to the interface device; and
a memory coupled to the processor, the memory having stored thereon computer executable instructions which, when executed, cause the processor to perform the computer-implemented method of claim 1.

* * * * *